(12) United States Patent
Yamazaki et al.

(10) Patent No.: US 8,256,844 B2
(45) Date of Patent: Sep. 4, 2012

(54) VEHICULAR SEAT HAVING A WALK IN MECHANISM

(75) Inventors: Hiroaki Yamazaki, Toyota (JP); Takafumi Sekino, Toyota (JP); Yasuyuki Okumura, Toyota (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 633 days.

(21) Appl. No.: 12/390,743

(22) Filed: Feb. 23, 2009

(65) Prior Publication Data
US 2009/0218872 A1 Sep. 3, 2009

(30) Foreign Application Priority Data
Mar. 3, 2008 (JP) .................................. 2008-052000

(51) Int. Cl.
*B60N 2/22* (2006.01)
*B60N 2/20* (2006.01)
*B60N 2/10* (2006.01)
(52) U.S. Cl. .................... 297/378.12; 297/334
(58) Field of Classification Search .................. 297/331, 297/334, 378.12
See application file for complete search history.

(56) References Cited

U.S. PATENT DOCUMENTS

| | | | | |
|---|---|---|---|---|
| 6,139,104 | A * | 10/2000 | Brewer | 297/353 |
| 6,464,299 | B1 * | 10/2002 | Castagna | 297/378.12 |
| 6,513,876 | B1 * | 2/2003 | Agler et al. | 297/378.14 |
| 6,739,668 | B2 * | 5/2004 | Coman et al. | 297/378.12 |
| 6,799,801 | B2 * | 10/2004 | Niimi et al. | 297/378.12 |
| 7,014,263 | B2 * | 3/2006 | Mukoujima et al. | 297/341 |
| 7,077,463 | B2 * | 7/2006 | Sun et al. | 297/15 |
| 7,086,698 | B2 * | 8/2006 | Shiraki | 297/367 R |
| 7,097,253 | B2 * | 8/2006 | Coughlin et al. | 297/378.12 |
| 7,114,779 | B2 * | 10/2006 | Thiel et al. | 297/378.12 |
| 7,121,624 | B2 * | 10/2006 | Pejathaya et al. | 297/378.12 |
| 7,137,666 | B2 * | 11/2006 | Haladuda et al. | 297/378.12 |
| 2003/0080601 | A1 | 5/2003 | Charras et al. | |

FOREIGN PATENT DOCUMENTS

JP 2003-159140 6/2003
JP 3771115 B2 2/2006

OTHER PUBLICATIONS

English language Abstract of JP 2001-341559 A (Dec. 11, 2001).
English language Abstract of JP 2003-159140 (Jun. 3, 2003).

* cited by examiner

*Primary Examiner* — David Dunn
*Assistant Examiner* — Tania Abraham
(74) *Attorney, Agent, or Firm* — Greenblum & Bernstein, P.L.C.

(57) ABSTRACT

A vehicular seat including a reclining apparatus capable of adjusting an angle of a seat back relative to a seat cushion, a tilt down mechanism, a walk in mechanism, a base member provided on a side of the vehicular floor, and a middle member provided between the base member and the seat back is provided. A lower portion of the middle member and the base member are connected to adjust an angle therebetween by the reclining apparatus, an upper portion of the middle member and the seat back are connected by a connecting apparatus of the walk in mechanism, the walk in mechanism includes a stopper apparatus for positioning the seat back at a normal angle and a forward tilting angle, and the tilt down mechanism moves the seat cushion in the lower direction toward the vehicular floor relative to the base member.

9 Claims, 5 Drawing Sheets

VEHICULAR SEAT HAVING A WALK IN MECHANISM

This application claims priority to Japanese patent application serial number 2008-52000, the contents of which are incorporated herein by reference.

BACKGROUND OF THE INVENTION

1. Field of the Invention

The present invention relates to a vehicular seat mounted in a vehicle of a car or the like.

2. Description of the Related Art

Various types of vehicular seats are known. For example, vehicular seat including a reclining apparatus for adjusting an angle of a seat back relative to a seat cushion, and a tilt down mechanism for moving the seat cushion in a skewed lower direction relative to a vehicular floor when the seat back is made to fall onto the seat cushion is known (referring to Japanese Patent No. 3771115). The vehicular seat includes a base member provided on a side of the vehicular floor, and a middle member provided between the base member and the seat back. A lower portion of the middle member is inclinably connected to the base member by a connecting apparatus of the tilt down mechanism. An upper portion of the middle member is connected to the seat back to be able to adjust an angle by the reclining apparatus.

Therefore, according to this configuration, the reclining apparatus is provided at the upper portion of the middle member, and therefore, the seat back is reclined around a constituting fulcrum at a comparatively high position, for example, a height of the waist of a user. This configuration makes use thereof difficult. Further, when the user gets in and out of the vehicle from behind the seat (by making the seat back fall onto the seat cushion), the seat back falls down along with the middle member by the connecting apparatus locating at the lower portion of the middle member. Therefore, a portion of the seat is expanded to a rear lower side of the seat along with the middle member or the seat back. This creates a problem in that a space of the rear side of the seat for the user stepping in is narrowed and it becomes difficult for the user to get in and out of behind the seat.

Further, when the seat back is made to fall onto the seat cushion, the seat cushion is moved in a skewed front direction toward the vehicular floor by the tilt down mechanism. Also, there is also a case in which the seat cushion abuts a front member locating at a front position than the seat cushion. And, the seat is not configured to maintain a position of the seat back relative to the seat cushion by a predetermined forward tilting angle. Thus, use of such a configuration is difficult.

Further, a vehicular seat including a walk in mechanism for maintaining a position of a seat back relative to a seat cushion by a predetermined forward tilting angle has been disclosed in Japanese Pat. No. 3723797. However, this configuration also provides a reclining apparatus of the vehicular seat at a comparatively low position. Therefore, when the seat back is made to fall by the predetermined forward tilting angle, a portion of the seat is expanded to a rear lower side of the seat, and the space on the rear side of the seat for the user stepping in is narrowed. Therefore, this creates a problem for the user to get in and out from the rear side of the seat. In view of these problems, an improved seat is needed.

SUMMARY OF THE INVENTION

One aspect of the present invention can include a vehicular seat including a reclining apparatus capable of adjusting an angle of a seat back relative to a seat cushion, a tilt down mechanism capable of moving the seat cushion in a lower direction toward a vehicular floor when the seat back is moved onto the seat cushion, a walk in mechanism capable of positioning the seat back relative to the seat cushion at a forward tilting angle, a base member provided on a side of the vehicular floor, a middle member provided between the base member and the seat back. Also, a lower portion of the middle member and the base member are connected to be able to adjust an angle therebetween by the reclining apparatus, an upper portion of the middle member and the seat back are connected by a connecting apparatus of the walk in mechanism, the walk in mechanism includes a stopper apparatus for positioning the seat back at a normal angle and a forward tilting angle which is forward from the normal angle relative to the middle member, and the tilt down mechanism moves the seat cushion in the lower direction toward the vehicular floor relative to the base member cooperatively with tilting the middle member relative to the base member.

Therefore, the seat back is tilted along with the middle member operating as a fulcrum at a comparatively low position. This provides better use of the seat back. Further, the connecting apparatus of the walk in mechanism is provided at the upper portion of the middle member. Therefore, the seat back is tilted until a forward tilting angle at a comparatively high position. Thus, a portion of the seat is not expanded to the rear lower side of the seat, and the problem of narrowing the space behind the seat is resolved. This allows a user is more easily to get in and out of the conveyance.

DETAILED DESCRIPTION OF THE INVENTION

Each of the additional features and teachings disclosed above and below may be utilized separately or in conjunction with other features and teachings to provide improved vehicular seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
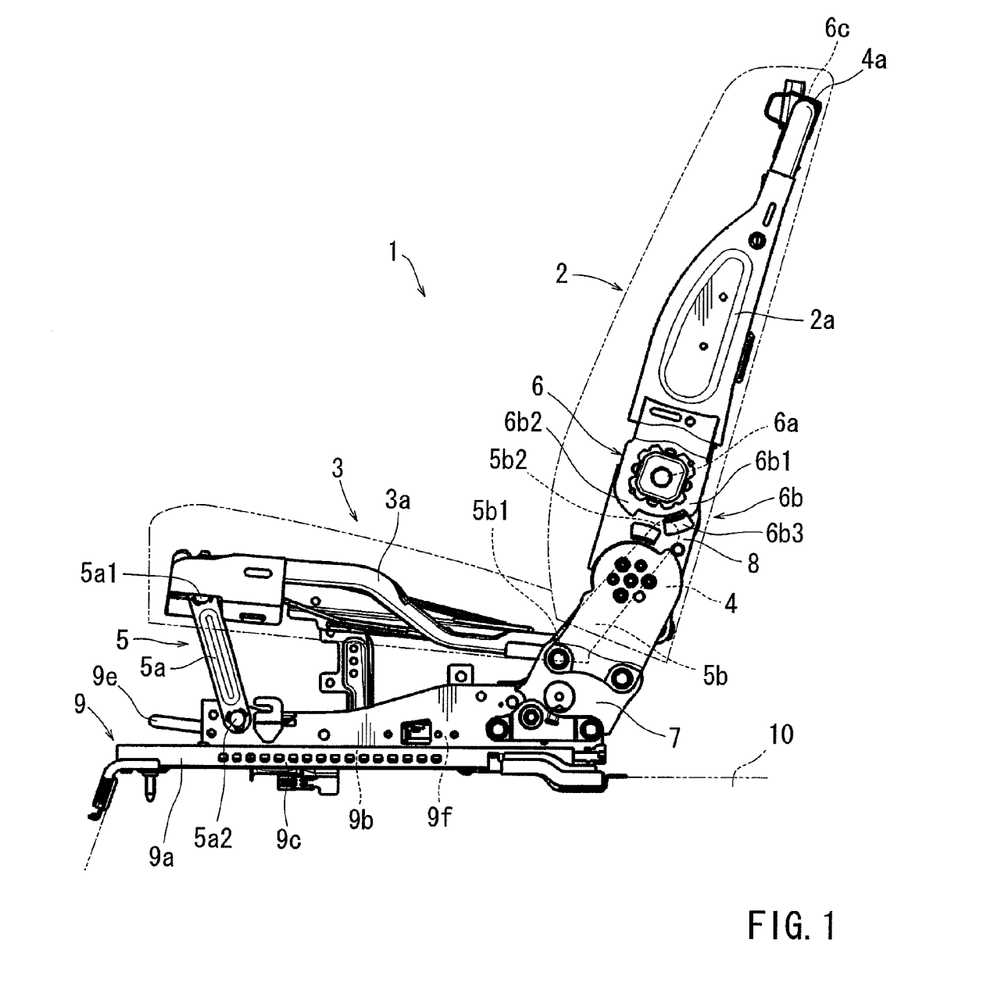
FIG. 1 is a left side view of a vehicular seat.

As shown in FIG. 1, a seat 1 is a seat mounted to a vehicle or the like, and is mounted as a second row seat in a vehicle that can include, for example, three rows of seats. The seat 1 includes a seat back 2 and a seat cushion 3 and a pair of base members 7.

Figure 2:
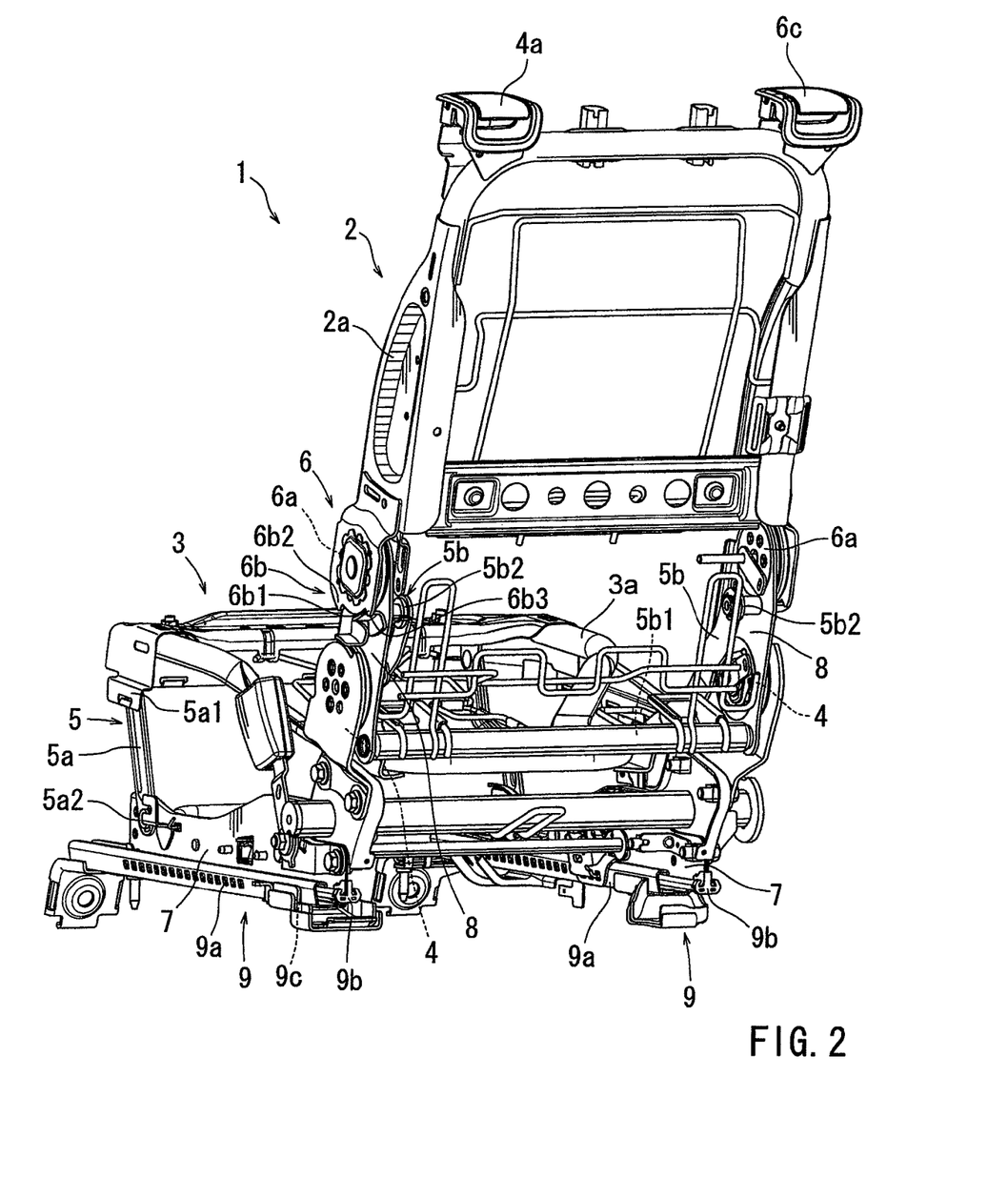
FIG. 2 is a perspective view of a frame construction of the seat.

As shown in FIGS. 1 and 2, the base members 7 are attached to a vehicular floor 10 by way of slide rails 9. The slide rail 9 includes a lower rail 9a fixed to the vehicular floor 10, an upper rail 9b slidably mounted on the lower rail 9a and a lock mechanism 9c for locking the lower rail 9a and the upper rail 9b. The base member 7 extends from an upper portion of the upper rail 9b. A release lever 9e, for releasing the lock mechanism 9c from being locked, is provided between front sides of the pair of base members 7.

Figure 3:
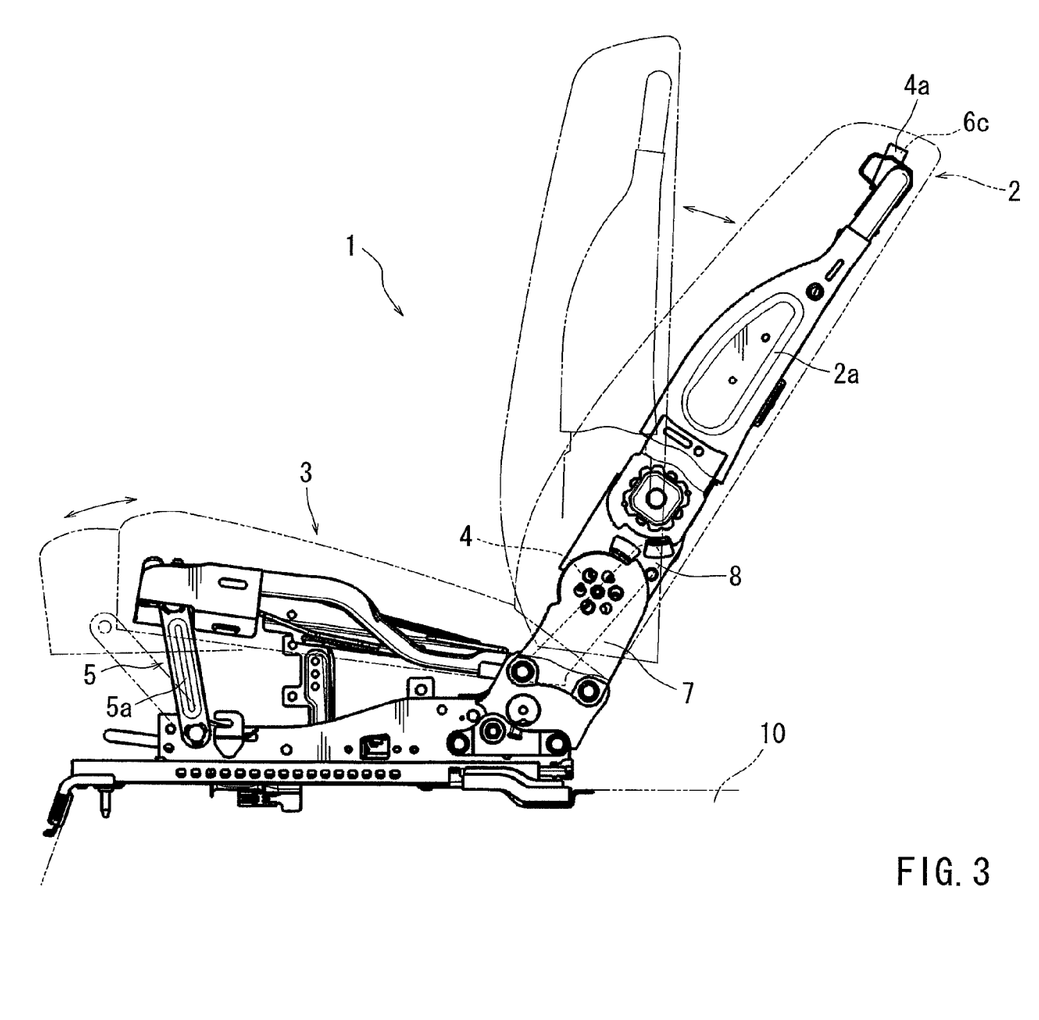
FIG. 3 is a left side view of the vehicular seat when a seat back is reclined.

As shown in FIGS. 1 and 2, middle members 8 are provided between the base member 7 and a frame 2a of the seat back 2. A lower portion of the middle member 8 is connected to a rear portion of the base member 7 by a reclining apparatus 4. An upper portion of the middle member 8 is connected to a lower portion of the frame 2a of the seat back 2 by a connecting apparatus 6a of a walk in mechanism 6. The reclining apparatus 4 can lock the base member 7 and the middle member 8, and and released the same by operating the operating lever 4a. Therefore, as shown in FIG. 3, an angle of the seat back 2 can be adjusted in a rearward tilting state relative to the base member 7 by constituting a fulcrum by the reclining apparatus 4.

Figure 4:
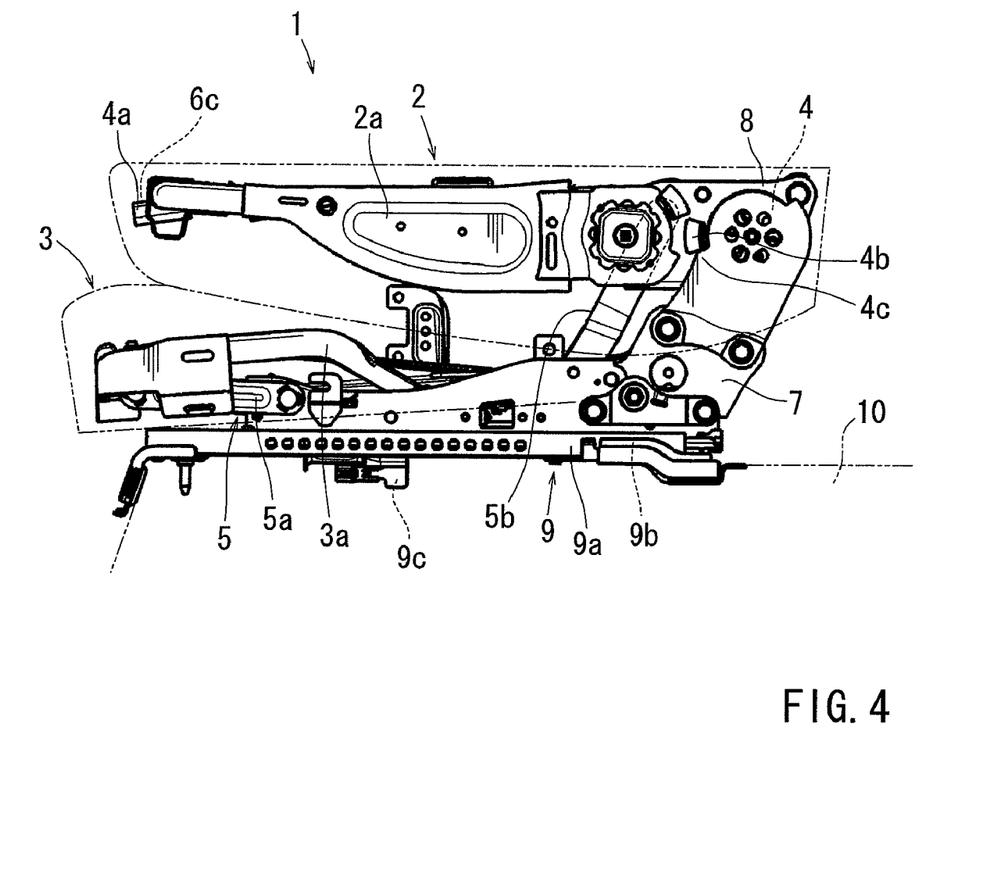
FIG. 4 is a left side view of the vehicular seat in a folded mode.

As shown in FIG. 4, the seat 1 includes a tilt down mechanism 5 for moving the seat cushion 3 in a lower direction toward the vehicular floor 10 relative to the base member 7 when the seat back 2 is made to fall onto the seat cushion 3. In this example, the seat cushion is moved in a lower and forward direction. The tilt down or cushion tilt mechanism 5 includes a leg 5a and a middle link 5b. According to the leg 5a, one end portion 5a1 is pivotably connected to a front portion of a frame 3a of the seat cushion 3, and other end portion 5a2 is pivotably connected to a front portion of the base member 7. According to the middle link 5b, one end portion 5b1 is fixed to a rear portion of the frame 3a of the seat cushion 3, and other end portion 5b2 extended from the frame 3a to a rear side is pivotably connected to a center portion or an upper portion of the middle member 8.

Therefore, by releasing the reclining apparatus 4 by use of operating lever 4a, and making the seat back 2 fall to the front side relative to the base member 7 along with the middle member 8, as shown in FIGS. 1 and 4, the leg 5a falls to the front side. As a result, the seat cushion 3 is moved in a front lower direction toward the vehicular floor 10. In this way, the seat 1 becomes compact by lowering the height in a folded state (tilt down mode). Further, falling of the seat back 2 to the front side is stopped by moving a third stopper 4b (provided at the middle member 8) to or into contact with a fourth stopper 4c (provided at the base member 7).

Figure 5:
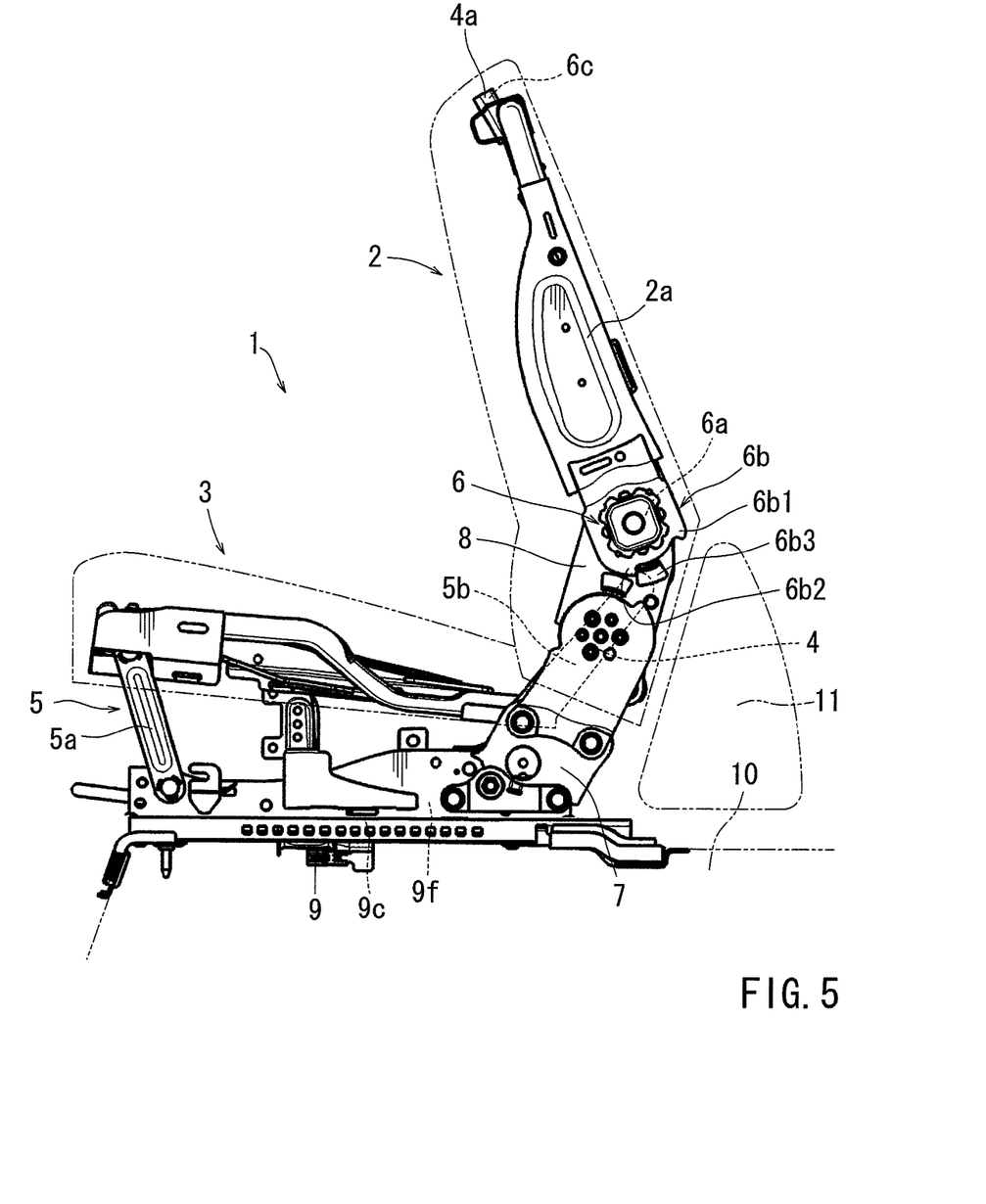
FIG. 5 is a left side view of the vehicular seat in a walk in mode.

As shown in FIG. 5, the seat 1 includes the walk in or seat back tilt mechanism 6 for forwardly positioning the seat back 2 relative to the seat cushion 3 by a forward tilting angle (for example, angle tilted forward by 15 through 60° to the front side of a vertical line). The walk in mechanism 6 includes the connecting apparatus 6a connecting the upper portion of the middle member 8 and the lower portion of the frame 2a and a stopper apparatus 6b. The connecting apparatus 6a can be constructed similar to the reclining apparatus 4, which increases commonly forming parts and thus increasing cost efficiency. The connecting apparatus 6a locks the middle member 8 and the frame 2a by a normal or sitting position angle and is released from being locked by a release lever 6c provided at an upper portion of the frame 2a.

As shown in FIGS. 1 and 5, the stopper apparatus 6b includes a first and a second stopper portion 6b1 and 6b2 provided at the frame 2a, and a stopper claw 6b3 provided at the middle member 8. The second stopper 6b2 is brought into contact with the stopper claw 6b3 by tilting the frame 2a to the front side relative to the middle member 8, and maintains a position of the frame 2a relative to the middle member 8 by a predetermined forward tilting angle (walk in mode). The first stopper portion 6b1 is brought into contact with the stopper claw 6b3 when the frame 2a is tilted to an original position relative to the middle member 8 and maintains the position of the frame 2a relative to the middle member 8 by a normal angle (normal use mode).

Although the connecting apparatus 6a is brought into a lock state in the normal use mode, the connecting apparatus 6a can be brought into a free state or be released from being locked at other position. Therefore, the seat 1 can easily be switched from the normal use mode to the walk in mode. As shown in FIG. 5, a cable 9f is provided between the frame 2a and the lock mechanism 9c of the slide rail 9. When the frame 2a tilts relative to the middle member 8, the frame 2a pulls the cable 9f, and the lock mechanism 9c is released from being locked. Therefore, the seat 1 is enabled to slide to the front side and thus be in the walk in mode. Further, a space 11 on the rear side of the seat for a user stepping in can be widened by sliding the seat 1 to the front side.

Further, as shown in FIG. 2, the operating lever 4a of the reclining apparatus 4 is positioned at an inner side of the vehicle (center side of conveyance). Therefore, the operating lever 4a is easy to operate from a rear seat side and the seat 1 can easily be brought into a tilt down mode. Further, the angle of the seat back 2 can also be adjusted easily. On the other hand, the release lever 6c of the walk in mechanism 6 is positioned at an outer side of a vehicle (conveyance door side). Therefore, the release lever 6c is easy to operate from the outer side of the vehicle, and the seat 1 can easily be brought into the walk in mode. In this way, getting in and out from the vehicle is facilitated.

As described above, the seat 1 includes the base member 7 provided on the side of the vehicular floor 10 and the middle member 8 provided between the base member 7 and the seat back 2 as shown in FIG. 1. Further, the lower portion of the middle member 8 and the base member 7 are connected to be able to adjust an angle therebetween by the reclining apparatus 4, and the upper portion of the middle member 8 and the seat back 2 are connected by the connecting apparatus 6a of the walk in mechanism 6.

Further, as shown in FIG. 3, the reclining apparatus 4 is provided at the lower portion of the middle member 8. Thus, the seat back 2 is tilted, along with the middle member 8, by operating as a fulcrum, at a comparatively low position. This design facilitates efficient and easy use in reclining the seat back 2. Further, as shown in FIG. 5, the connecting apparatus 6a of the walk in mechanism 6 is provided at the upper portion of the middle member 8. Therefore, the seat back 2 can be tilted to a forward tilting angle at a comparatively high position. Thus, a portion of the seat 1 is not expanded to the rear lower side of the seat 1, and the problem of narrowing the space 11 of the rear side of the seat for ease of entering is resolved. Thus, this design also facilitates efficient and easy entering/exiting behind the seat 1.

Further, the as shown in FIG. 5, the walk in mechanism 6 includes the stopper apparatus 6b. The stopper apparatus 6b allows the position of the seat back 2 to be maintained easily at a desired forward tilting angle. Further, as shown in FIGS. 1 and 4, the tilt down mechanism 5 is configured to move cooperatively with inclining the middle member 8. Therefore, when the seat back 2 is made to fall onto the seat cushion 3 by the reclining apparatus 4, the seat cushion 3 is moved toward the lower side relative to the vehicular floor 10. Therefore, the seat 1 is compactly brought into a folded mode. On the other hand, as shown in FIG. 5 when the seat back 2 is made to fall by the predetermined forward tilting angle by the connecting apparatus 6a of the walk in mechanism 6, the middle member 8 is not inclined. Therefore, in the walk in mode, there is not a concern of moving the seat cushion 3 down, which in prior designs would abut a front member or the like. Thus, this configuration is user friendly and results in reduced interference with other users.

As shown in FIGS. 1 and 2, the tilt down mechanism 5 includes the leg 5a connecting the one end portion 5a1 pivotably to the front portion of the seat cushion 3 and connecting the other end portion 5a2 pivotably to the base member 7, and the middle link 5b extended from the rear portion of the seat cushion 3 and pivotably connected to the middle member 8. Therefore, the tilt down mechanism 5 is configured to move the seat cushion 3 in a lower direction relative to the vehicular floor 10 only when the middle member 8 is inclined.

Further, the stopper apparatus 6b of the walk in mechanism 6 includes the first and the second stopper portions 6b1 and 6b2 provided at the seat back 2 and the stopper claw 6b3 provided at the middle member 8. Further, the first and the second stopper portions 6b1 and 6b2 move relative to the stopper claw 6b3 by inclining the seat back 2 relative to the middle member 8. Therefore, the stopper apparatus 6b has a simple configuration that is cost effective.

While the invention has been described with reference to specific configurations, it will be apparent to those skilled in the art that many alternatives, modifications and variations may be made without departing from the scope of the present invention. Accordingly, the present invention is intended to embrace all such alternatives, modifications and variations that may fall within the spirit and scope of the appended claims. For example, the present invention should not be limited to the representative configurations, but may be modified as described below.

(1) In FIGS. 1 and 4, the tilt down mechanism 5 is configured to move the seat cushion 3 toward a front lower direction relative to the vehicular floor 10 when the seat back 2 is made to fall onto the seat cushion 3. However, a tilt down mechanism for moving a seat cushion in a rear lower direction, a right lower direction, and a left lower direction with respect to the vehicular floor when the seat back is made to fall onto the seat cushion can be realized.

(2) In FIGS. 1 and 2, the base member 7 is configured to be attached to the vehicular floor 10 by way of the slide rail 9. However, a configuration of directly providing the base member to the vehicular floor, or a configuration in which the base member is a portion of the vehicular floor can be realized.

(3) In FIG. 5, the stopper apparatus 6b includes the first and the second stopper portions 6b 1 and 6b2 on the side of the frame 2a of the seat back 2 and includes the stopper claw 6b3 on the side of the middle member 8. However, a configuration in which the first and the second stopper portion are provided on the side of the middle member and the stopper claw on the side of the seat back can be realized.

(4) In FIGS. 1 and 2, the seat is mounted in the vehicle. However the seat may be mounted in any type of conveyance or the like.

This invention claims:

1. A vehicular seat comprising:
a reclining apparatus capable of adjusting an angle of a seat back relative to a seat cushion;
a tilt down mechanism configured to move the seat cushion in a lower direction toward a vehicular floor when the seat back is moved onto the seat cushion;
a walk in mechanism configured to position the seat back relative to the seat cushion at a forward tilting angle;
a base member provided on a side of the vehicular floor; and
a middle member provided between the base member and the seat back,
wherein a lower portion of the middle member and the base member are connected to adjust an angle therebetween by the reclining apparatus,
an upper portion of the middle member and the seat back are connected by a connecting apparatus of the walk in mechanism,
the walk in mechanism includes a stopper apparatus for positioning the seat back at a normal angle and a forward tilting angle which is forward from the normal angle relative to the middle member,
the stopper apparatus of the walk in mechanism includes a first stopper portion and a second stopper portion provided at either one of the seat back and the middle member and a stopper claw provided at the other,
the first stopper portion and the second stopper portion move relative to the stopper claw by tilting the seat back relative to the middle member,
the tilt down mechanism moves the seat cushion in the lower direction toward the vehicular floor relative to the base member cooperatively with tilting of the middle member relative to the base member, and
the tilt down mechanism includes a leg having a one end portion that is pivotably connected to a front portion of the seat cushion and an other end portion that is pivotably connected to the base member.

2. The vehicular seat as in claim 1, wherein the tilt down mechanism includes a middle link that extends from a rear portion of the seat cushion and pivotably connected to the middle member.

3. The vehicular seat as in claim 1, wherein:
the seat back is positioned relative to the middle member by the normal angle by moving the first stopper portion to the stopper claw, and
the seat back is positioned relative to the middle member by the forward tilting angle by moving the second stopper portion to the stopper claw.

4. The vehicular seat as in claim 1, wherein the stopper claw is provided at the other in a fixed manner.

5. A vehicular seat comprising:
a reclining apparatus configured to adjust an angle of a seat back relative to a seat cushion;
a cushion tilt mechanism configured to move the seat cushion in a lower direction when the seat back is moved onto the seat cushion;
a seat back tilt mechanism configured to position the seat back relative to the seat cushion at a forward tilting angle; and
a middle member provided between a base member and the seat back,
wherein a lower portion of the middle member and the base member are connected to adjust an angle therebetween by the reclining apparatus,
an upper portion of the middle member and the seat back are connected by a connecting apparatus of the seat back tilt mechanism,
the seat back tilt mechanism includes a stopper apparatus for positioning the seat back at a sitting position angle and a forward tilting angle which is forward from the sitting position angle relative to the middle member, the stopper apparatus of the seat back tilt mechanism includes a first stopper portion and a second stopper portion provided at either one of the seat back and the middle member and a stopper claw provided at the other, the first stopper portion and the second stopper portion move relative to the stopper claw by tilting the seat back relative to the middle member, the cushion tilt mechanism moves the seat cushion in the lower direction relative to the base member cooperatively with tilting of the middle member relative to the base member, and the cushion tilt mechanism includes a leg having a one end portion that is pivotably connected to a front portion of the seat cushion and an other end portion that is pivotably connected to the base member.

6. The vehicular seat as in claim 5, wherein the cushion tilt mechanism includes a middle link that extends from a rear portion of the seat cushion and is pivotably connected to the middle member.

7. The vehicular seat as in claim 5, wherein the seat back is positioned relative to the middle member by the sitting position angle by moving the first stopper portion to the stopper claw.

8. The vehicular seat as in claim 7, wherein the seat back is positioned relative to the middle member by the forward tilting angle by moving the second stopper portion to the stopper claw.

9. The vehicular seat as in claim 5, wherein the stopper claw is provided at the other in a fixed manner.

* * * * *

UNITED STATES PATENT AND TRADEMARK OFFICE
CERTIFICATE OF CORRECTION

PATENT NO. : 8,256,844 B2
APPLICATION NO. : 12/390743
DATED : September 4, 2012
INVENTOR(S) : H. Yamazaki et al.

It is certified that error appears in the above-identified patent and that said Letters Patent is hereby corrected as shown below:

At column 5, line 63 (claim 1, line 2), please replace "capable of adjusting" with --configured to adjust--.

At column 6, line 34 (claim 2, line 3), please insert --is-- before pivotably.

Signed and Sealed this
Fifth Day of February, 2013

Teresa Stanek Rea
*Acting Director of the United States Patent and Trademark Office*